United States Patent [19]

Johnson

[11] 3,785,518
[45] Jan. 15, 1974

[54] SPARE TIRE CARRIER
[76] Inventor: Bernard Lee Johnson, 709 Locust Ave., Coeur d'Alene, Idaho 83814
[22] Filed: Mar. 10, 1972
[21] Appl. No.: 233,615

[52] U.S. Cl. .............................. 214/454, 214/83.24
[51] Int. Cl. ............................................ B62d 43/00
[58] Field of Search .................... 214/454, 453, 452, 214/451

[56] References Cited
UNITED STATES PATENTS
| | | | |
|---|---|---|---|
| 3,648,867 | 3/1972 | Beavers | 214/454 |
| 2,645,394 | 7/1953 | DeBord | 214/454 |
| 3,330,431 | 7/1967 | Knecht | 214/454 |
| 3,494,493 | 2/1970 | Fowler | 214/454 |
| 3,620,396 | 11/1971 | Abfalter | 214/454 |

Primary Examiner—Gerald M. Forlenza
Assistant Examiner—John Mannix
Attorney—Wells, St. John & Roberts

[57] ABSTRACT

A spare tire carrier for use in removably mounting the spare tire of a wheeled vehicle to the vehicle's undercarriage at a location behind the rear axle. The carrier includes a pivotable support means and telescoping members which allow easy removal of the tire from the storage position to a variety of extended delivery positions adjacent the vehicle outer periphery rearward of the rear axle.

5 Claims, 6 Drawing Figures

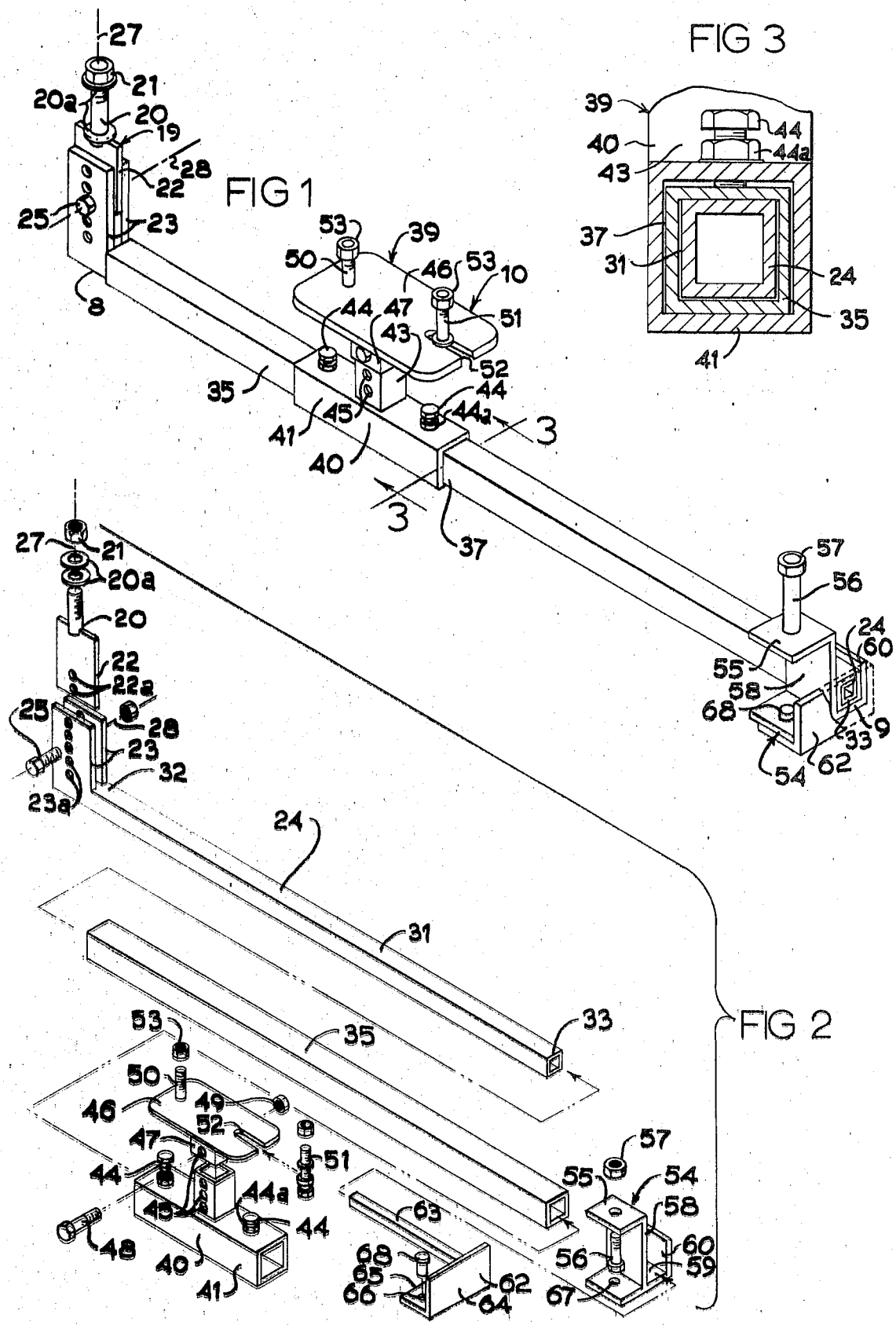

SPARE TIRE CARRIER

BACKGROUND OF THE INVENTION

The present invention relates to carriers for vehicle spare tires and more particularly to such carriers which serve to store the tire adjacent the vehicle undercarriage behind the rear axle.

Vehicles which utilize such carriers are generally of the truck variety, having a considerable amount of clearance between the undercarriage and ground. Storing the spare tire at such a location is advantageous in that more space above the undercarriage may be otherwise utilized. However, when a flat tire necessitates removal of the spare, several difficulties may occur. Firstly, the operator must have adequate access to the spare. If the damaged tire happens to be either of the rear pair, access is hampered by reduced ground clearance. Further, to remove the spare, the operator must either reach or crawl under the vehicle; a distasteful and possibly dangerous task in bad weather.

Prior patents which have realized these difficulties to some degree are the Fowler U.S. Pat. No. 3,494,493 and the DeBord U.S. Pat. No. 2,645,394.

The Fowler Patent describes a spare tire carrying device having a hanger mechanism for mounting the device to a vehicle frame. The hanger mechanism provides support to a vertically pivotable wheel support bar carrying a channel-shaped sliding-tire carrier. The support may be operated to lower the spare tire from the storage position adjacent the vehicle undercarriage and the carrier slid along the support bar to a delivery position adjacent the rear of the vehicle. Since the sliding tire carrier doesn't completely enclose the support bar, road dirt and oil may accumulate on the exposed surfaces of the bar. Such accumulation seriously impedes the sliding motion of the carrier on the bar thereby rendering it extremely difficult for the user to pull the carrier and tire to the delivery position and, likewise, to move it back to the storage position. Further, since the support bar and carrier pivot only about horizontal axes, the tire may be withdrawn from under the vehicle only to a fixed position adjacent the vehicle periphery.

The DeBord Patent discloses a spare tire holder which mounts the tire to the vehicle undercarriage in a storage position and is vertically pivotable to a delivery position below the undercarriage. The tire is mounted to the holder in such a manner that the user must crawl or reach under the vehicle to dislodge the tire from its storage position.

The present invention includes a telescoping tire carrier mountable at one inside end of coaxially telescoping tubular members to a vehicle undercarriage by an inner first support which allows both horizontal and vertical pivotal movement of the carrier. The spare tire is removably mounted to the outer member of the telescoping means for movement therewith. Since the outer telescoping member overlaps the full length of the inner member during storage, dirt and grime are prevented from accumulating thereon. The free outside end of the carrier may be lowered from a second outside support to slide the tire out from underneath the vehicle body. Since the carrier may be pivoted horizontally, the tire may be removed from either of the sides behind the rear axle or at the back of the vehicle.

A first object of my invention is to provide a vehicle spare tire carrier which facilitates easy removal of a spare tire from a storage position behind the rear axle and adjacent the vehicle's undercarriage, to a delivery position clear of either of the vehicle sides or back, rearward of the rear axle.

Another object is to provide such a carrier that, when in the storage position, prevents accumulation of road dirt and grime on the parts essential to its efficient operation.

A further object is to provide such a carrier wherein the spare tire may be mounted to and dismounted from the carriage at a location outwardly adjacent the vehicle periphery.

A yet further object is to provide a spare tire carrier that may be less expensive in comparison to prior related devices and substantially easier to install.

An additional object is to provide such a carrier that is adjustable not only to accommodate different tire rims but to also accommodate tires of different diameters and thicknesses.

A further object is to provide such a tire carrier that is operable from the vehicle periphery without requiring the user to reach or crawl beneath the vehicle.

These and further objects and advantages will become evident upon reading the following detailed description which, in conjunction with the accompanying drawings, describe a preferred embodiment of my invention.

BRIEF DESCRIPTION OF THE DRAWINGS

FIG. 1 is an isometric view of the spare tire carrier;

FIG. 2 is an exploded isometric view of the spare tire carrier illustrating the relationship of the various parts thereof;

FIG. 3 is an elevational cross section taken along line 3—3 in FIG. 1;

DESCRIPTION OF A PREFERRED EMBODIMENT

Figure 4:
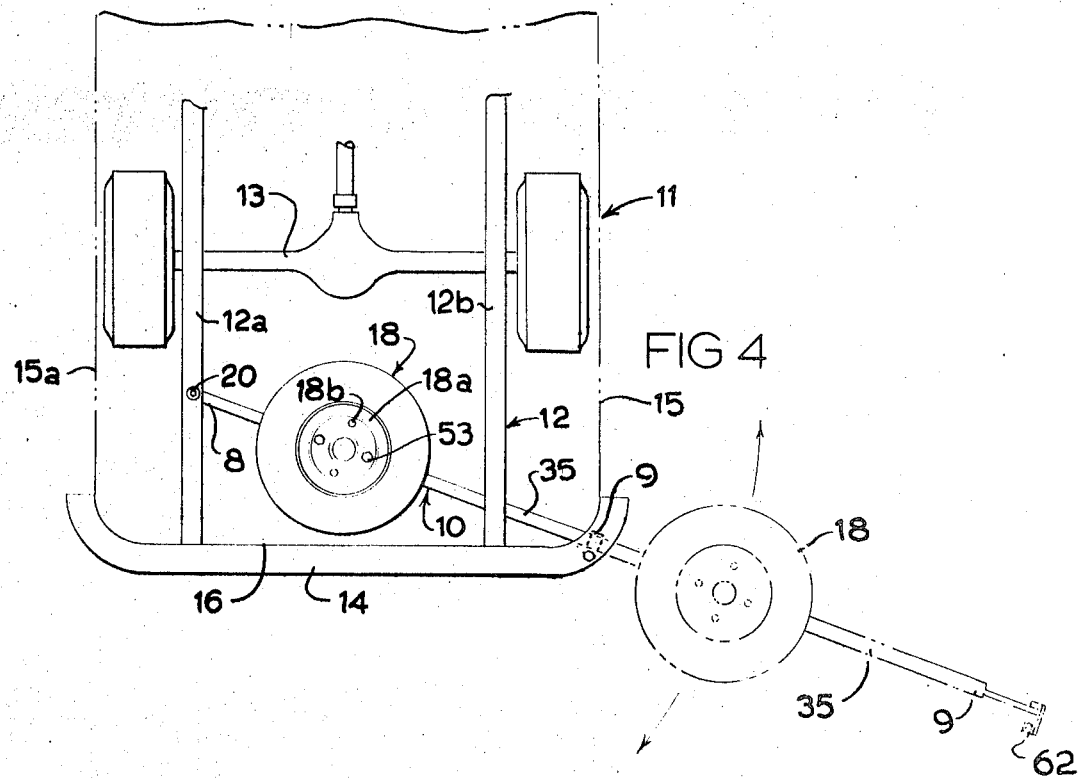
FIG. 4 is a fragmentary plan view of the carrier mounted to a vehicle frame with the extended delivery position of the carrier shown in dashed lines.
Figure 5:
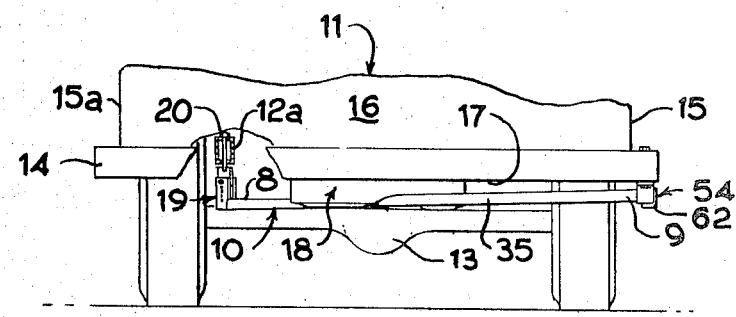
FIG. 5 is a fragmentary elevational view of the carrier of FIG. 3.
Figure 6:
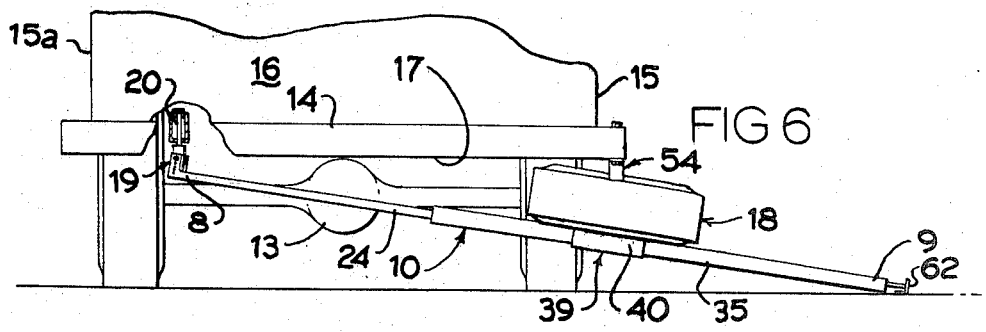
FIG. 6 is a view similar to FIG. 4 only showing the extended delivery position of the carrier.

Referring now in detail to the drawings, there is shown in FIGS. 4, 5 and 6 a spare tire carrier generally indicated by reference numeral 10 for removably mounting a spare tire 18 to the undercarriage 17 of a wheeled vehicle 11.

Vehicle 11, shown partially in FIGS. 4, 5 and 6, may be of the truck variety or another related vehicle having clearance from the ground level to undercarriage 17 and frame 12 adequate to allow mounting of spare tire 18 beneath the frame 12 and above the ground level. The rear portion of vehicle 11 is shown in FIG. 4 includes parallel longitudinal frame members 12a and 12b, a transverse rear axle 13, and a rear bumper 14. Frame 12 provides support for the vehicle body which includes longitudinal peripheral sides 15, 15a and a rear peripheral side 16.

Spare tire carrier 10, as shown in FIGS. 4, 5 and 6, is pivotably mounted adjacent undercarriage 17 and behind axle 13 to one frame member 12a at an inside end 8 and to the bumper 14 at a free outer end 9.

The inside end 8 of carrier 10 is pivotably mounted to frame member 12a rearwardly adjacent axle 13 by a first support means 19 which may best be seen in FIGS. 1 and 2. Means 19 includes a stud bolt 20 which when mounted to vehicle 11, extends upwardly through a hole in frame member 12a to threadably receive a nut 21. Bolt 20 and nut 21 are designed to allow free horizontal pivotal movement of carrier 10 about a vertical axis 27 (FIG. 1) defined by the bolt 20. Washers 20a are provided on the bolt 20 for positioning below and above the frame to facilitate horizontal pivotal movement. This movement is an important feature in that it facilitates removal of tire 18 to any location adjacent sides 15, 15a or 16 behind axle 13.

Bolt 20 is affixed, at its lower end, to a rectangular hanger plate 22. A bolt 25 extends through plate 22 and an adjacent pair of upwardly extending ears 23 of carrier 10 to allow vertical pivotal movement of carrier 10 about a horizontal axis 28 defined by the bolt 25. Plate 22 has a plurality of vertically spaced holes 22a therein to provide for vertical adjustment when aligned with vertically spaced holes 23a in ears 23. The vertical pivotal movement about axis 28 allows carrier 10 to be elevationally pivoted from the storage position shown in FIG. 5 to the delivery position shown in FIG. 6.

Ears 23 extend upwardly from the inside end 32 of an elongated tubular member 24. Member 24 extends outwardly from end 32 a distance somewhat greater than the outside diameter of spare tire 18 to an outside end 33. The member 24 is rectangular in cross section as may be seen in FIG. 3.

Member 24 is slidably received within an elongated outer tubular member 35. Member 35 has a rectangular cross section (FIG. 3) slightly larger and complementary to the cross sectional periphery 31 of inside member 24. This relatively loose fit permits member 35 to slide coaxially over member 24. Spare tire 18 is removably mounted to member 35 for movement therewith from a contracted storage position to an extended delivery position.

The complementary rectangular cross sections of members 24 and 35 are further utilized to prevent pivotal movement of the attached spare tire 18 about the longitudinal axes of the members 24, 35.

Member 35 also has a length perferably somewhat greater than the outside diameter of spare tire 18. Thus when carrier 10 is in the storage position, as shown in FIG. 5, member 35 extends inwardly from an outer end adjacent the vehicle periphery, to overlap outside end 33 and more than half the length of member 24, and preferably the full length of member 24. The overlapping relationship of members 24 and 35 in the storage position of carrier 10 is an important feature of my invention, in that it prevents build up of road dirt and grime on the sliding surfaces of members 24 and 35. The free telescoping movement of member 35 and attached tire 18 over member 24 is thereby assured.

The telescoping translational movement of tubular member 35 outwardly over member 24 brings the removably attached tire 18 to the delivery position shown in FIG. 6. Outer end 33 of member 24 remains slidably engaged within the inward end portion of member 35 at the delivery position.

Spare tire 18 as shown in FIG. 4 is mounted to a wheel rim 18a having four mounting holes 18b. It should be noted that the number of holes 18b, the size of rim 18a and the outside diameter and thickness of tire 18 may vary as do models of vehicles. Therefore, carrier 10 provides a mounting fixture 39 adjustably mounted to the outside 37 of tubular member 35 that is adapted to receive different size tires with corresponding rim sizes and varying numbers of mounting holes 18b.

Mounting fixture 39 includes a T-shaped tubular member or bracket 40 which is mounted to outside member 35 for movement therewith. Bracket 40 includes a horizontal tubular member 41 having a rectangular cross section for slidably receiving member 35 along the longitudinal axes of members 24, 35. Bracket 40 may be selectively positioned along member 35 by a pair of bolts 44 which extend through threaded nuts 44a affixed to member 41 and holes (not shown) in member 41. Bolts 44 may be tightened against outside tubular member 35 to prevent undesired movement of mounting fixture 39 with respect to member 35. This adjustability of fixture 39 permits mounting of tires having varying outside diameters.

Bracket 40 further includes an upright leg 43 which comprises part of a vertical telescoping support for a spare tire mounting plate 46. Leg 43 is received within a vertical complementary opening of a downwardly protruding tubular section 47 of plate 46. Both leg 43 and tubular section 47 include vertically spaced holes 45. A bolt 48 and nut 49 may be utilized to adjust plate 46 vertically perpendicular to the coaxial movement members 24 and 35 by engagement through a preselected aligned set of holes 45. The vertical adjustment of plate 46 thereby facilitates a snug fit for tire 18 between carrier 10 and vehicle undercarriage 17 in the storage position regardless of the thickness of the tire.

Spare tire 18 may be removably attached to mounting device 39 by wheel bolts 50, 51 which extend upwardly from plate 46 through complementary mounting holes 18b in wheel rim 18a. Bolts 50, 51 threadably engage lug nuts 53 which serve to hold tire 18 in place on carrier 10. Bolt 51 is held within an elongated slot 52 in plate 46. Slot 52 allows bolt 51 to be selectively spaced from bolt 50 to facilitate mounting of tires with rims 18a having different numbers of mounting holes 18b or different spacing of such holes.

The free, outer end of carrier 10 is held in the storage position against movement by a second support means 54 mounted adjacent the vehicle periphery. Support 54 may be seen, in FIGS. 4, 5 and 6, rigidly affixed to the underside of vehicle bumper 14.

Support means 54 is fixed to bumper 14 through means of a bolt 56 extending upwardly from an upper horizontal surface 55 through bumper 14 to threadably receive a nut 57. A vertical section 58 (FIGS. 1 and 2) extends downwardly from surface 55 to form one side of a U-shaped section 59. The other vertical side member 60 of U-shaped section 59 extends upwardly a distance substantially less than side 58 to allow clearance between its upper edge and the bottom surface of bumper 14, for the outer tubular member 35 to pass therebetween. Section 59, as seen in FIG. 5, receives and supports the free outer end 9 of carrier 10 at an elevation somewhat higher than the inside end. The resultant incline of members 24 and 35 serves to direct tire 18 and portions of carrier 10 attached thereto, inwardly. This feature is notable in preventing movement of the tire when the carrier 10 is in the storage position.

A locking device 62 is provided to prevent the unauthorized removal of the spare tire. The locking device 62 has an elongated rod-like member 63 that extends into the end 33 of the tubular member 31 and a face member 64 that covers the end 33. The face member 64 has a lip 65 with a hole 66 for aligning with a hole 67 in the support means 54. A locking pin 68 may be inserted through the holes 67 and 66 to prevent the outside tube 35 from being slid outward. The locking device is also helpful in lifting the outer end of the tube 35 to push the tube back under the vehicle to the storage position.

The operation of my invention may best be seen in FIGS. 4, 5 and 6. FIGS. 4 and 5 show carrier 10 mounted, in the storage position to vehicle 10. The extended delivery position of carrier 10 is shown in dashed line in FIG. 4 and in solid line in FIG. 6.

To move tire 18 to the delivery position, the operator simply lifts and pivots the outside end 9 away from support 54 and lowers it elevationally below the support. While lowering the outside end of carrier 10, member 35 may be coaxially slidably moved on member 24 to bring tire 18 to an easily accessible delivery position alongside the vehicle outer periphery. The pivotal characteristics of first support means 19 about vertical axis 27 allows movement of carrier 10 and tire 18 about a radius as shown by directional arrows in FIG. 4 to a variety of delivery locations behind axle 13.

Once the tire 18 has been moved to a selected delivery position, it may be easily lifted from plate 46, after removal of lug nuts 53.

Replacement of a tire 18 on carrier 10 is accomplished by first placing one mounting hole 18b of rim 18a over mounting bolt 50. Bolt 51 may then be aligned with a mounting hole 18b most nearly diametrically opposing the hole engaged over bolt 50. Once the selected hole 18b and bolt 51 are in alignment, the tire may be lowered over bolt 51 and nuts 53 secured to affix the tire to carrier 10.

To move tire 18 to the storage position, the operator lifts outside carrier end 9, pushes member 35 and attached tire 18 inwardly coaxially on member 24 towards the carrier inside end 8, and subsequently lifts end 9 into engagement with the U-shaped bracket 59 of second support means 54.

Previous adjustment of the vertical position of plate 46, with regard to the thickness of tire 18, insures a relatively snug fit of the tire against vehicle undercarriage 17 thereby preventing vibration and firmly securing end 9 within support 54.

Various changes and modifications may be made without departing from the intended spirit and scope of my invention. The scope of my invention is defined by the following claims.

What I claim is:

1. A spare tire carrying device for normally supporting a spare tire having a prescribed diameter underneath a frame of a wheeled vehicle and for enabling the spare tire to be readily removed from underneath the vehicle and brought to the periphery of the vehicle when use of the spare tire is desired, said device comprising:

an inside tubular member having a length between ends greater than the diameter of the spare tire;
   a first supporting means affixed to one end of the first tubular member for attaching the one end to the vehicle frame to support said one end beneath the frame and above ground level with the other end being free and extending horizontally outward toward the periphery of the vehicle;
   an outside tubular member having a length between ends greater than the diameter of the spare tire and an enclosed cross section larger than and complementary to the cross section of the inside tubular member;
   said outside tubular member being coaxially mounted on the inside tubular member for telescopic coaxial movement between a contracted storage position in which the outside tubular member overlaps more than half the length of the inside tubular member with one end of the outside tubular member terminating adjacent the periphery of the vehicle to prevent road dirt and the like from coating on the overlapped portion of the inside tubular member and an extended delivery position with the one end of the outside tubular member extended well beyond the periphery of the vehicle;
   a spare tire fixture mounted on the outside tubular member for movement therewith to receive and attachably secure the spare tire to the outside tubular member;
   the spare tire fixture being mounted to the outside tubular member for adjustment perpendicular to the coaxial movement of the outside tubular member to vary the height of the spare tire relative to the tubular members;
   said spare tire fixture having a T-shaped tubular member having a cross tubular section thereof coaxially mounted on the outside of the outside tubular member and means for adjustably securing the tubular section to the outside tubular member at a desired longitudinal position; and
   a second supporting means for affixing to the vehicle adjacent the periphery of the vehicle for releasably receiving and supporting the one end of the outside tubular member above ground level.

2. The spare tire carrying device as defined in claim 1 wherein the first support means has pivot means for vertically and horizontally pivotally connecting the one end of the inside tubular member to the frame to enable the free end of the inside tubular member to be pivoted both horizontally and vertically.

3. The spare tire carrying device as defined in claim 1 wherein the outside tubular member has a length sufficient to overlappingly cover the free end of the inside tubular member both in the contracted position and in the extended position.

4. The spare tire carrying device as defined in claim 1 wherein the spare tire fixture is also mounted for longitudinal adjustment on the outside tubular member to vary the horizontal position of the spare tire relative to the tubular members.

5. The spare tire carrying device as defined in claim 1 wherein the T-shaped tubular member has a tubular leg section and wherein the spare tire fixture further includes a plate having wheel bolts affixed thereto for securing to a rim of the spare tire and a tubular member projected from the plate for adjustably mounting telescopically on the tubular leg section.

* * * * *